United States Patent [19]

Mininni et al.

[11] Patent Number: 4,997,601

[45] Date of Patent: Mar. 5, 1991

[54] PROCESS FOR DRY SPINNING THERMALLY SENSITIVE ORGANOSILICON PRECERAMIC FIBERS WITH PRODUCTION OF CERAMIC FIBERS THEREFROM

[75] Inventors: Robert M. Mininni, Califon; M. Ishaq Haider, Springfield; Stuart M. French, Chatham; John L. Wesley, Wayne, all of N.J.

[73] Assignee: Hoechst Celanese Corp., Somerville, N.J.

[21] Appl. No.: 355,856

[22] Filed: May 17, 1989

Related U.S. Application Data

[63] Continuation of Ser. No. 145,314, Jan. 19, 1988, abandoned, which is a continuation-in-part of Ser. No. 791,635, Oct. 25, 1985, abandoned.

[51] Int. Cl.[5] .......................... D01F 6/96; D01F 9/10; D01F 11/04
[52] U.S. Cl. .................................. 264/29.2; 264/56; 264/83; 264/205; 264/211; 264/211.16; 264/211.17; 501/95
[58] Field of Search .................... 264/29.2, 59, 177.13, 264/56, 83, 205, 211, 211.16, 211.17; 501/88, 95; 423/345; 528/24

[56] References Cited

U.S. PATENT DOCUMENTS

| | | | |
|---|---|---|---|
| 3,324,061 | 6/1967 | Tanquary et al. | 264/205 |
| 3,814,792 | 6/1974 | Arakawa et al. | 264/205 |
| 4,097,294 | 6/1978 | Rice et al. | 501/88 |
| 4,283,376 | 8/1981 | Yajima et al. | 423/345 |
| 4,395,460 | 7/1983 | Gaul | 501/88 |

*Primary Examiner*—Hubert C. Lorin
*Attorney, Agent, or Firm*—DePaoli & O'Brien

[57] ABSTRACT

Preceramic fibers are produced by dissolving a solid organosilicon preceramic polymer in a solvent to form a spinning solution containing at least seventy percent polymer solids, dry spinning and extracting solvent in the presence of a non-oxidizing gas at a temperature and pressure sufficient to vaporize solvent from the fiber, and at least one curing agent being added to the non-oxidizing gas or spinning solution, or both, to induce on-line curing of the fiber or to aid in subsequent curing of the fiber or both. The preceramic fibers are thereafter pyrolyzed to ceramic form.

7 Claims, No Drawings

4,997,601

PROCESS FOR DRY SPINNING THERMALLY SENSITIVE ORGANOSILICON PRECERAMIC FIBERS WITH PRODUCTION OF CERAMIC FIBERS THEREFROM

RIGHTS OF THE GOVERNMENT

This invention was made with Government support under a Subcontract with Dow Corning under Prime Contract No. F33615-83-C-5006 awarded by the Department of Defense (DOD). The Government has certain rights in this invention.

This application is a continuation of U.S. Ser. No. 145,314 filed Jan. 19, 1988 which was a continuation-in-part of U.S. Ser. No. 791,635 filed Oct. 25, 1985, both of which are now abandoned.

FIELD OF THE INVENTION

This invention relates to the production of preceramic and ceramic fibers from organosilicon polymers.

BACKGROUND OF THE INVENTION

Ceramic materials are of critical importance for a number of high temperature, high performance applications such as gas turbines. These applications require a unique combination of properties such as high specific strength, high temperature mechanical property retention, low thermal and electrical conductivity, hardness and wear resistance, and chemical inertness. Design reliability and the need for economical fabrication of complex shapes, however, have prevented ceramic materials from fulfilling their potential in these critical high temperature, high performance applications.

The design reliability problems with ceramics, and the resultant failure under stress, are due largely to the relatively brittle nature of ceramics. This, in combination with the high cost of fabricating complex shapes, has limited the usage of ceramics.

Ceramics made from organosilicon polymers have the potential to overcome these problems. To this end, polymers based on silicon, carbon and/or nitrogen have been developed. See, for example, "Siloxanes, Silanes and Silazanes in the Preparation of Ceramics and Glasses" by Wills et al, and "Special Heat-Resisting Materials from Organometallic Polymers" by Yajima, in *Ceramic Bulletin*, Vol. 62, No. 8, pp. 893-915 (1983), and the references cited therein.

The major and most critical application for ceramics based on polymer processing is high strength, high modulus, reenforcing fibers. Such fibers are spun from organosilicon preceramic polymers, and then cured and pyrolyzed to their ceramic form. The low molecular weight and highly branched structure of typical preceramic polymers, however, alters the spinning and subsequent fiber handling behavior of these polymers from that of conventional polymers. See U.S. Pat. No. 4,283,376 which states that such spinning and fiber handling problems have been attacked through manipulation of the molecular weight distribution and molecular structure of the organosilicon polymer under consideration. Thermal sensitivity, however, remains a particular problem, since gelation and foaming tendencies at high melt temperatures may lead to the presence of undesirable flaws in the resulting fiber. Such flaws are undesirable in fine diameter fibers since they are believed to be the source of cracking and lowered tensile strength.

Thus, the search has continued for improvements in the non-conventional spinning and fiber handling areas of ceramic fiber technology. The present invention was made as a result of this search.

SUMMARY OF THE INVENTION

Accordingly, a primary object of the present invention is to provide an improved process for the production of preceramic and ceramic fibers from organosilicon polymers.

Another object of the present invention is to provide improved dry spinning processes for the production of thermally sensitive, organosilicon preceramic fibers and ceramic fibers made therefrom.

In accordance with one aspect of the present invention, an improved process has been found for the production of preceramic fibers from organosilicon polymers This process includes dissolving a solid organosilicon preceramic polymer in a solvent to form a spinning solution containing at least about seventy percent polymer solids; thereafter dry spinning the polymer solution to form an organosilicon preceramic fiber; and extracting solvent in the presence of a non-oxidizing gas at a temperature and pressure sufficient to vaporize solvent in the fiber.

The relatively high solids concentration of the organosilicon polymer in the spinning solution has been found to be critical to achieving self-supporting continuous fine diameter fiber. If insufficiently high concentrations of organosilicon polymer solids are used, threadline breakdown has been found to occur frequently.

In accordance with a further aspect of the present invention, at least one curing agent is added to at least one of the spinning solution and the non-oxidizing gas to induce on-line curing of the fiber and/or to aid in subsequent cure of the spun fiber to an infusible form.

In accordance with a further aspect of the present invention, the solution spun fiber is taken up with fiber contact at a minimum sufficient to avoid substantial abrasion of the fiber. This in turn avoids loss of fiber strength.

In accordance with a further aspect of the present invention, a ceramic fiber is produced from the solution spun fiber by curing and pyrolyzing the same.

In accordance with another more particular aspect of the present invention, a process for producing a ceramic fiber from a thermally sensitive organosilicon preceramic polymer is provided. This process includes:

(I) dissolving a solid organosilicon polymer prepared from at least one methylchlorodisilane and hexamethyldisilazane in an aromatic hydrocarbon solvent, the polymer being dissolved to form a spinning solution containing at least about eighty percent polymer solids;

(II) while maintaining the polymer in solution in an essentially gel-free state, dry spinning the polymer into a flaw-free fiber;

(III) taking up the spun fiber with fiber contact at a minimum sufficient to avoid substantial abrasion of the fiber;

(IV) extracting essentially all of the solvent in the presence of an inert gas and at a temperature and pressure sufficient to vaporize the solvent in the fiber;

(V) curing the spun fiber to render it infusible;

(VI) and thereafter pyrolyzing the cured fiber to produce a ceramic fiber.

These and other objects and aspects and advantages, as well as the scope, nature and utility of the present

DESCRIPTION OF THE PREFERRED EMBODIMENTS

The Organosilicon Preceramic Polymers

Organosilicon preceramic polymers are well known in the art. Such polymers contain silicon, carbon and/or nitrogen, are fiber-forming, and can be cured and pyrolyzed to ceramic form. See, for example, U.S. Pat. Nos. 4,310,651; 4,312,970 and 4,340,619, which are incorporated herein by reference. Such polymers optionally may be modified with chemical groups to allow subsequent curing in the absence of oxygen. See, for example, U.S. Pat. No. Re. 31,947, which is incorporated herein by reference.

These organosilicon precursor polymers may be made in a variety of ways as is known in the art. For example, they may be made by first dechlorinating an alkylchlorosilane, e.g., dimethyldichlorosilane, and polymerizing the product to form a polysilane, e.g., polydimethylsilane. This material is then heated to convert its backbone of silicon atoms to a backbone of alternating silicon and carbon atoms by forming a polycarbosilane.

Hydridopolysilylazane is an exemplary polymer of the silicon-nitrogen type.

Metallo-type organosilicon preceramic polymers are also known, e.g., polymetallocarbosilanes and polymetallodisilylazanes as described in U.S. Pat. No. 4,482,689, which is incorporated herein by reference.

Preferably, the organosilicon preceramic polymers utilized in the present invention consist essentially of silicon, carbon and nitrogen Such polymers are typically prepared by reacting a disilazane and a dichlorodisilane or a methylchlorodisilane.

Most preferably, the organosilicon preceramic polymers of the present invention are characterized as polysilazanes, e.g., methylpolydisilylazane, prepared from at least one methylchlorodisilane and hexamethyldisilazane. Optionally, addition of difunctional monosilanes as co-reactants may be used to enhance spinning and/or subsequent fiber handling properties. Such difunctional monosilanes include preferably $R_1R_2SiCl_2$, where $R_1$ and $R_2$ may independently be a methyl, phenyl or vinyl group.

Such organosilicon preceramic polymers may be further modified, for example, by incorporating vinyl functionality by reaction with the polymer itself. This may be achieved, for example, by co-reacting the polymer with a vinyl (Vi) halosilane such as $ViR_1R_2SiCl$ where $R_1$ and $R_2$ may each independently be methyl or phenyl.

Another preferred type of organosilicon polymer which is thermally sensitive and which may be especially suitable in the present invention comprises a plurality of cyclic and/or linear precursor residues of the repeating units of formula I:

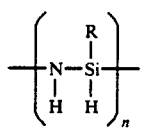

linked together by $Si_2N_2$ bridges of formula II,

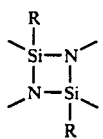

wherein R is hydrogen, a lower alkyl group having from 1 to about 6 carbon atoms, a substituted or unsubstituted vinyl group, a substituted or unsubstituted alkyl group, a substituted or unsubstituted benzyl group, a substituted or unsubstituted lower aryl group having from 6 to about 10 carbon atoms, tri(lower)alkyl- or di(lower)alkylsilyl group, a di(lower)alkylamino group, a lower alkoxy group having from 1 to about 6 carbon atoms; and n is an integer greater than one. The substituted groups are substituted with lower alkyl and lower aryl groups.

These polymers form novel ladder-like or planar array structures that are soluble in common organic solvents, stable at room temperature and thermally stable up to about 550° C. The ladder-like or planar array polymers of the present invention are formed in high yield by reaction of the cyclic and/or linear residues in the presence of a basic catalyst capable of deprotonating an NH function adjacent to silicon. For further description of these polymers and the methods of making them, see U.S. Pat. No. 4,489,669, which is incorporated by reference.

Molecular weight ($M_n$) for the above organosilicon preceramic polymers should be sufficient to be fiber-forming at the high solids concentrations but not so viscous as not be spinnable, and may vary from about 500 to 20,000, more typically about 700 to 5,000, and most typically about 900 to 2,000 (g/mole-GPC method). These polymers may also have softening temperatures ($T_s$) of about 50° C. to 300° C., preferably about 60° C. to 200° C., and most preferably 70° C. to 150° C.

Spinning of the Fibers

As indicated earlier, the above-described organosilicon preceramic polymers are dry spun or extruded as fibers or filaments.

To dry spin, the solid organosilicon polymer is dissolved in a solvent at a relatively high polymer solids concentration, and thereafter the polymer is spun or extruded to form flaw-free organosilicon preceramic fiber.

Any solvent in which the organosilicon polymer may be dissolved at the relatively high solids concentration may be used. Suitable aliphatic hydrocarbon solvents may include those having from 1 to 8 carbon atoms and having boiling points ranging from about 30° C. to about 190° C. Typical aliphatic hydrocarbon solvents include n-hexane, cyclo-hexane, cyclo-hexene, n-pentane, cyclopentadiene, iso-octane, acetonitrile, dichloroethane, trichloroethane, hexachloroethane, chloroform, methylchloroform, methylene chloride, methyl acetate, ethyl acetate, carbon tetrachloride, and tetrahydrofuran. Suitable aromatic hydrocarbon solvents may include those having from 6 to 10 carbon atoms and have boiling points ranging from about 70° C. to 180° C. Typical aromatic hydrocarbon solvents include toluene, xylene, styrene, benzene, chlorobenzene, dichlorobenzene, ethylbenzene, and isopropylbenzene. Toluene and xylene are particularly preferred.

Prior to spinning, any gel detected in the polymer should be removed such as by filtration. In addition, the polymer should be essentially free of other contaminants such as small insoluble particulates.

As indicated above, the relatively high solids concentration of the polymer in the spinning solution is critical to achieving a self-supporting threadline with these low-molecular weight polymers. If insufficiently high an organosilicon polymer solids concentrations are used, threadline breakdown will frequently occur. Preferably, polymer solids concentrations of at least about seventy percent, and most preferably at least about eighty percent are used.

After dissolution and prior to spinning, the polymer should be maintained in solution in an essentially gel-free state, i.e., kept under conditions insufficient to cause gel formation of polymer in the solvent.

The actual solution temperatures at spinning may vary, but will generally be near the boiling point of the solvent (to improve solvent evaporation) but below that at which foaming, gelation or other degradation occurs within the total dry spinning residence time. Typically, at spinning such solution temperatures will be between about 70° C. and 200° C., preferably 70° C. to 150° C. and most preferably 90° C. to 120° C.

As the preceramic fibers are dry spun and solvent-extracted, fiber handling is preferably minimized to avoid abrasion of the fibers sufficient to cause fiber breakage during fiber take-up and/or sufficient to induce latent stressing sufficient to cause fiber breakage during subsequent curing and ceramization. Thus, those types of conventional fiber take-up apparatus which induce high levels of stress in fiber are preferably not used. The preceramic fibers during and after spinning and solvent extraction are relatively brittle due to their relatively low molecular weight as compared to conventional fiber-forming polymers.

The preceramic fibers as spun may be taken up in any appropriate draw ratio. For example, draw ratios of between about 10 to about 500, preferably 15 to 300, and most preferably 20 to 50, may be used.

Spinning may be conducted at any convenient die pressure under ambient conditions, or nitrogen or other inert gas may be used in the spinning chamber. Atmosphere, subatmosphere, or superatmospheric pressure may be used in the spinning chamber.

As indicated above, solvent, and preferably essentially all of the solvent, is extracted or evaporated from the spun preceramic fiber by the use of a non-oxidizing extracting gas at a temperature and pressure sufficient to vaporize the solvent from the fiber. Typical non-oxidizing gases for solvent extraction include inert gases such as nitrogen and argon, which are preferred.

Atmospheric, subatmospheric or super-atmospheric pressures may be used in the solvent extraction zone. At atmospheric pressures, temperatures of extraction may range from about 70° C. to 150° C., preferably 90° C. to 120° C.

Conveniently, extraction may take place in the spinning chamber, or if preferred further downstream from the spinning chamber. Sufficient solvent removal or extraction should take place before building-up any substantial thread-breaking stresses from gravity effects or from fiber handling equipment.

Various additives may be added to the extracting gas or to the spinning solution to provide an on-line curing mechanism and/or to aid in subsequent curing of the fiber. For example, curing additives such as, ultra-violet curing agents, ammonia, trichlorosilane, oxygen and moisture may be incorporated in at least one of the spinning solution and the extracting gas to induce on-line curing of the fiber and/or to aid in the subsequent curing of the fiber. Also, spinning aids such as lubricants, polymeric strength enhancers, and the like may also be incorporated into the spinning solutions.

The preceramic fibers of the present invention are preferably "flaw-free" for highest density and highest tensile properties. "Flaw-free" is defined herein as the substantial absence of and preferably essentially free of, flaws detectable at 10 power magnification. Flaws are any physical aberration which can lead to a stress concentration under load, and include surface abrasions, notches, bubbles, inclusions and other discontinuities in density and/or diameter of the fiber.

The preceramic fibers of the present invention have typical diameters of from 2 to 100, preferably 5 to 50 μm, and most preferably 8 to 20 μm.

Ceramization of the Fibers

After spinning, the preceramic fibers are typically cured or cross-linked to an infusible form and thereafter pyrolyzed to ceramic form.

Effective curing conditions are defined as those curing conditions after which the cured fibers are infusible, i.e., may be pyrolyzed without melting or fusing together. A variety of cure methods may be used. These include oxidative and hydrolytic cures, reactive cures, thermal cures and radiolytic cures. The preferred method of curing is via an oxidative/hydrolytic cure. Typically, this entails heating the fibers in a controlled humidity environment.

Curing may be carried out at temperatures from about 20° C. to 400° C., preferably 50° C. to 300° C., and most preferably 150° C. to 200° C., the rate of curing increasing with temperature.

Effective pyrolysis conditions are those which render the fibers ceramic. Typically, pyrolysis is conducted in an inert atmosphere of nitrogen, argon, or the like. Pyrolysis temperatures may be from about 600 to 1600° C., preferably 800 to 1400° C., and most preferably 1000 to 1250° C.

Utility of the Ceramic Fibers

The ceramic fibers produced in accordance with the present invention may be used in high performance composites of any desired shape, e.g., gas turbine engines, and engine components, as is evident to those skilled in the art.

EXAMPLES

The present invention is further illustrated by the following specific examples, wherein all parts and percentages are by weight unless otherwise indicated.

General Procedure and Apparatus

Dry spinning is done on a spinning apparatus designed to give effective solvent extraction In operation, the spinning solution containing the dissolved polymer is pumped through a series of filters (wire mesh filter type). Upon exiting the filter, the polymer solution passes through a steam jacketed heat exchanger and then a five hole spinneret ($5 \times 10^{-2}$ mm diameter $\times 0.3$ mm long holes). The polymer solution leaves the spinneret at a linear velocity of about 10 meters per minute (mpm), passes through a nitrogen-filled spinning chamber about 70 cm long and then through a nitrogen-filled solvent evaporating glass mantle about 120 cm long, and is then taken up on a bobbin at about 1000 mpm. In the approximately 2.5 meter distance between the spinneret and the bobbin, the filament experiences a draw ratio sufficient to produce a spun fiber diameter of approximately 15–20μm. The fiber is wound on the bobbin without traversing and effort is made to avoid subjecting the fiber to abrasion-inducing handling. The fiber on the bobbin is then stored in a nitrogen-filled chamber held at a dew point of −40° C. or lower, prior to subsequent curing and pyrolysis.

EXAMPLE I

An organosilicon polymer, a methylpolydisilylazane containing phenyl and vinyl functionality prepared from methyl
chorodisilane (MCDS) and hexamethyldisilazane (HMDS$_z$), and phenylvinyldichlorosilane (Ph-ViSiCl$_2$), and having a molecular weight (M$_n$) of about 900, is used. The polymerization proceeds in two stages: (1) Initial amination of Si-Cl bonds; and (2) Condensation polymerization (increasing molecular weight). Volatiles are driven off during the course of these reactions. The polymer material is then prepared for spinning by dissolving in a toluene solution containing 80 percent polymer solids. The polymer solution is pumped through the filter to remove salts and gels, passes through the heat exchanger and then the polymer solution exits through the spinneret and is taken up on a bobbin at 500 meters per minute. The temperature inside the spinning chamber at the spinneret is about 46° C., and the average temperature in the drying column is about 130° C. The spinning is stable and no gelation or foaming of the polymer is expected to be observed. The resulting preceramic fiber is expected to be determined to be flaw-free.

The preceramic fiber is then taken from its dry chamber and cured by holding it at 200° C. for 36 hours at at least 50 percent humidity. The cured fiber is then pyrolyzed at 1200° C. for 3 hours to ceramic form. Typical characteristics of the ceramic fiber would be expected to be:

| Fiber diameter | 20 μm (0.0008 inch) |
| Tensile strength | 700 MPa (100 ksi) |
| Elastic modulus | 120 GPa (17 Msi) |
| Density | 2.2 Mg/m$^3$ |

Elemental composition would be expected to be:

| Silicon | 52% |
| Carbon | 18% |
| Nitrogen | 6% |
| Oxygen | 22% |
| Hydrogen | ND |
| Chlorine | 2% |

EXAMPLE II

On-line curing can be provided in a dry spinning process such as described in Example I by injecting into the spinning chamber and/or the drying column (which contains an inert atmosphere such as nitrogen or argon) a small amount of a suitable curing agent. For dry spinning and on-line curing of a polycarbosilane or hydridopolysilazane polymer, with the spinning chamber and drying column at the temperatures and conditions described, approximately 100 cc/minute of trichlorosilane is introduced to either or both of these spaces, creating a concentration of about 0.2 to 0.4 mole percent of the additive, which cures the spun organosilicon preceramic fiber in less than 30 seconds of exposure, normally about 10 to 15 seconds. The cured fiber can then be conveyed directly to the pyrolysis stage, avoiding the time-consuming separate curing step described in Example I.

EXAMPLE III

An evaluation was conducted of spinning solutions in order to determine the concentration of preceramic polymer needed to achieve acceptable dry spun fibers. Dry spinning solutions were formulated by dissolving methylpolydisilazane in hexane at polymer concentrations of 40%, 60%, 70%, and 80% polymer solid levels. The polymer had a glass transition temperature, T$_g$ equal to 157° C., indicating that the polymer had a relatively high molecular weight.

Each polymer solution was stored under nitrogen and then pumped through a filter prior to being pumped to the spinneret. A 5 hole, 250 micron diameter spinneret was used. Nitrogen was upflowed through the spinning cylinder countercurrent to the flow of fibers directed from the spinneret. The column temperature was 45° C. Fibers issuing from the spinneret were dried and collected.

The 40% polymer solution was formulated. Surprisingly, it was evaluated as having a very low solution viscosity of about 200 poise. In view of the observable low viscosity, it was realized that this polymer solution would not result in fiber formation despite attempts to spin such solution at substantially lower temperatures.

Fibers were spun from the spinning solutions containing 70% and 80% polymer solids and collected. The fibers had a diameter of at least about 30 microns.

The spinning solution containing 60% polymer solids was not able to be extruded into fibers. The spinning solution continued to have a low solution viscosity (about 600 poise) and thus, instead of being spun into fibers, simply dripped from the spinning jet.

Although the invention has been described with preferred embodiments, it is to be understood that variations and modifications may be employed without departing from the gist of the invention.

What is claimed is:

1. A process for producing preceramic fibers from an organosilicon preceramic polymer, which process comprises dissolving a solid organosilicon preceramic polymer in a solvent to form a spinning solution containing at least about seventy percent polymer solids; thereafter dry spinning the polymer to form an organosilicon preceramic fiber; and extracting solvent in the presence of a non-oxidizing gas at a temperature and pressure sufficient to vaporize solvent from the fiber, at least one curing agent being added to the non-oxidizing gas or to the spinning solution or both to induce on-line curing of the fiber or to aid in subsequent curing of the fiber or both.

2. The process of claim 1 wherein said organosilicon preceramic polymer is a hydridopolysilazane.

3. A process according to claim 1 wherein said curing agent is added to the non-oxidizing gas.

4. A process according to claim 1 wherein said curing agent is added to the spinning solution.

5. A process according to claim 1 wherein the solution spun fiber is cured to an infusible form.

6. A process for producing a ceramic fiber wherein the cured fiber produced by the process of claim 5 is pyrolyzed to a ceramic fiber.

7. A process according to claim 1 wherein the molecular weight ($M_n$) of the preceramic polymer is from about 500 to 20,000, and wherein the solvent is toluene or xylene.

* * * * *